(12) United States Patent  
Warinner

(10) Patent No.: US 9,293,274 B1  
(45) Date of Patent: Mar. 22, 2016

(54) APPARATUS FOR USING HANDHELD DEVICES

(71) Applicant: Peter Q. Warinner, Belmont, MA (US)

(72) Inventor: Peter Q. Warinner, Belmont, MA (US)

( * ) Notice: Subject to any disclaimer, the term of this patent is extended or adjusted under 35 U.S.C. 154(b) by 0 days.

(21) Appl. No.: 14/135,041

(22) Filed: Dec. 19, 2013

Related U.S. Application Data

(63) Continuation-in-part of application No. 12/938,354, filed on Nov. 2, 2010, now abandoned.

(51) Int. Cl.
| | |
|---|---|
| *H01H 3/00* | (2006.01) |
| *H01H 13/00* | (2006.01) |
| *H01H 9/00* | (2006.01) |

(52) U.S. Cl.
CPC ....... *H01H 9/0066* (2013.01); *H01H 2217/004* (2013.01); *H01H 2217/008* (2013.01); *H01H 2221/024* (2013.01); *H01H 2221/066* (2013.01); *H01H 2300/024* (2013.01)

(58) Field of Classification Search
CPC . H01H 3/14; H01H 2003/00; H01H 2003/14; H01H 2215/00; H01H 2221/008; H01H 2221/018; H01H 2223/01; H01H 2223/04; H01H 2231/008; H01H 2231/01; H01H 2231/022; H01H 2231/052; H01H 2239/074
USPC .......... 200/338, 158, 159, 163, 500; 345/156, 345/157, 163, 179, 173; 463/37; 401/7, 8, 401/214; 294/25

See application file for complete search history.

(56) References Cited

U.S. PATENT DOCUMENTS

| | | | |
|---|---|---|---|
| 6,249,277 B1 * | 6/2001 | Varveris ........................ 345/179 |
| 7,849,521 B1 | 12/2010 | Cromwell | |
| 7,874,021 B2 | 1/2011 | Sunder et al. | |
| 8,336,119 B2 | 12/2012 | Phelps | |
| 8,570,273 B1 * | 10/2013 | Smith ................... G06F 3/0338 345/156 |
| 2005/0231471 A1 | 10/2005 | Mallard et al. | |
| 2006/0221066 A1 | 10/2006 | Cascella | |
| 2006/0254898 A1 * | 11/2006 | O'Leary ....................... 200/500 |
| 2007/0013681 A1 * | 1/2007 | Chou .................. G06F 3/03543 345/179 |
| 2007/0245454 A1 | 10/2007 | Eklund | |
| 2010/0243974 A1 * | 9/2010 | Jaeger .................. G06F 3/0202 254/133 R |
| 2012/0103770 A1 * | 5/2012 | Warinner ...................... 200/330 |

\* cited by examiner

*Primary Examiner* — Renee S Luebke  
*Assistant Examiner* — Anthony R. Jimenez  
(74) *Attorney, Agent, or Firm* — Michael I. Kroll

(57) ABSTRACT

An apparatus for using a hand-held device is disclosed. In a first embodiment, an apparatus for using a hand-held device includes a body configured to conform to a digit, and a member connected to the body adjacent to the digit, wherein bringing the member into contact with the hand-held device transfers force from the digit to the hand-held device. In another embodiment, the member may be movable to a desired position along a slot located on the outer surface of the body.

8 Claims, 10 Drawing Sheets

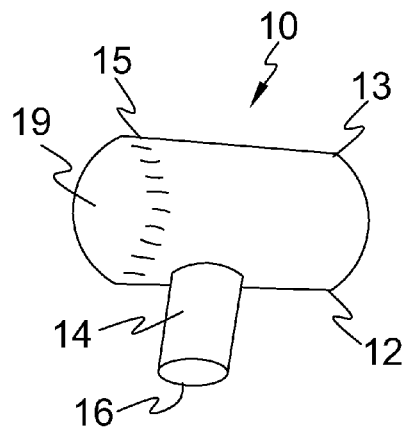
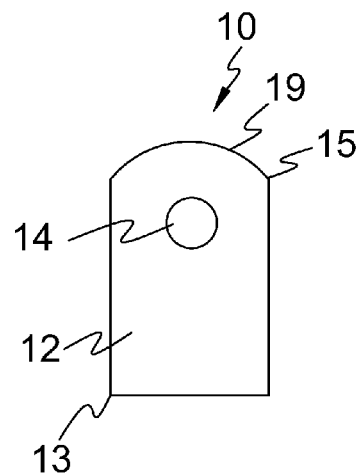
FIG. 4A  FIG. 4B
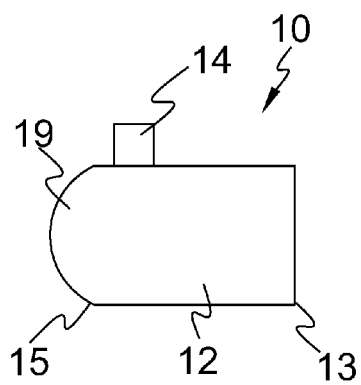
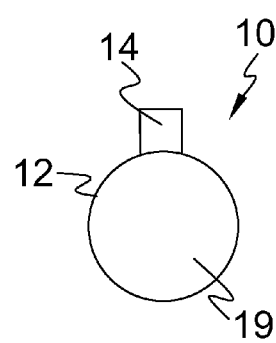
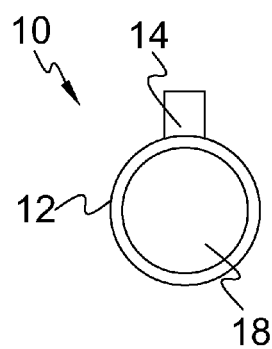
FIG. 4C  FIG. 4D  FIG. 4E

APPARATUS FOR USING HANDHELD DEVICES

RELATED APPLICATIONS

This application is a Continuation-In-Part of U.S. patent application Ser. No. 12/938,354, having a filing date Nov. 2, 2010.

Please incorporate by reference all information in said patent applications into this continuation-in-part application.

BACKGROUND OF THE INVENTION

1. Field of the Invention

The presently disclosed embodiments relate to an apparatus for using hand-held devices, and more particularly to an apparatus for improved user control of hand-held devices. Even more specifically, the present invention relates to an apparatus for hand-held devices that facilitates the use of the integral keyboard located on the device.

Handheld devices such as Smartphones, Tablet Computers, and Mobile Phones are now used by billions of people worldwide. Competition in the hand-held device consumer market is fierce. Companies continue to search for new designs to penetrate the tremendous hand-held device market. Despite the large capital flows being used to create new and improved devices, they continue to suffer from many shortcomings pertaining to their usability. In particular, the limited space available on the surface of the units makes it difficult for the manufacturers to provide user friendly interfaces. Accordingly, there exists a need for an apparatus that can improve the user's control over the device without enlarging the space currently available for the user interfaces.

2. Description of the Prior Art

There are other tools and apparatus which provide for easing the use of various hand-held devices. While these additions and improvements may be suitable for the purposes for which they where designed, they would not be suitable for the purposes of the present invention as heretofore described. It is thus desirable to provide an apparatus for facilitating the use of a hand-held device that aids the user in interacting with the keyboard of such a device.

It is further desirable to have an apparatus that fits smoothly and easily over areas of the user's hand.

It is also desirable to have an apparatus that may be adjusted to fit varying circumstances, users, or the specific interface requirements of certain devices.

SUMMARY OF THE PRESENT INVENTION

Consumers are increasingly relying on hand-held devices to perform everyday tasks. For example, consumers use hand-held devices for communicating (e.g., email, text-messaging, voice, data) with family, friends, and business contacts, daily planning (e.g., calendars, reminders), recreation (e.g., playing casual games, blogging, tweeting, listening to music, watching videos, and reading books), GPS navigation, and many more popular applications. Among the more common hand-held devices are mp3 players, digital book readers, Smartphones, and touch phones, to name a few.

Handheld devices such as the IPOD®, the IPHONE®, the KINDLE®, and Smartphones like the BLACKBERRY®, have transformed the way in which consumers carry out their everyday tasks. Among the driving forces behind the tremendous popularity of hand-held devices, the convenience of their small size ranks high. However, the drive for miniaturization of these devices also is a source of major frustration and drawbacks for many of them. In particular, hand-held devices invariably require precise stroking of miniature keys that are often just fractions of a size of an average user's digit. In addition, with the advent of touch screens, the sensitivity of touch keys and other various digit controllers has made it more and more difficult for users to obtain desired responses without having to backtrack or delete, or otherwise correct for errors. Such difficulty in obtaining desired results when interacting with hand-held devices is a common occurrence among mainstream users of hand-held devices. Imagine how much more frustrating it is for users with clumsy hands, limitations from debilitating diseases, such as carpal tunnel syndrome, neuromuscular disorders, arthritic disorders, or for users with larger than average fingers. All of these factors slow down the speed and accuracy with which a hand-held device user is able to obtain desired responses, such as writing a text message.

In addition to the challenges inherent in using ordinary hand-held devices, it is believed that frequent use of devices requiring repetitive strokes with the thumb or other digit in an often unnatural pattern can lead to increased occurrence of certain undesirable health outcomes, such as numbness in the hands or digits.

Without wishing to be bound by theory, it is also believed that users with varying degrees of physical limitation, such as those users with neuromuscular disorders or arthritic disorders, have reduced access to use of, or general difficulty using hand-held devices.

Due to the limited spacing available on hand-held devices to accommodate standard Qwerty keyboards, designing user interfaces (e.g. keypads or touch screens) having ergonomic designs to minimize injury to the user have been difficult.

Accordingly, there exists a need for an apparatus that can provide one or more of the following benefits:

Improve speed for users of hand-held devices;

Improve accuracy for users of hand-held devices;

Improve ergonomics for users of hand-held devices;

Reduce injury associated with the use of hand-held devices; and/or

Increase access to use of (or ease of use of) hand-held devices by users with varying degrees of physical limitation.

As used herein, "hand-held device" refers those electromechanical devices which are intended to be, or are otherwise capable of being used with physical manipulations of the hand whether held in the hand or otherwise, including, but not limited to a smart phone, a cellular phone, a mobile phone, a messaging phone, a calculator, a tablet, a personal digital assistant, a digital or electronic book reader, an mp3 player, a multimedia player, a video game console, a portable GPS, and equivalents or combinations thereof.

As used herein, "responsive portion" refers to any input portion of a typical input/output paradigm for electromechanical devices as part of a user interface that allows a user to interact with the device so that physical manipulations of the input portion result in a unique ascertainable output initiated on the electromechanical device. Examples of responsive portions include, but are not limited to, a keyboard, a virtual keyboard, a digital keyboard, a keypad, a digital keypad, a virtual keypad, a key, a digital key, a virtual key, a touch screen, a touch pad, a touch key, an onscreen keyboard, an onscreen key, an icon, an application icon, a button, a digital button, a virtual button, a touch screen button, a data entry field, a digital data entry field, a virtual data entry field, an alphanumeric key, a symbol, a virtual symbol, a digital symbol, and equivalents or combinations thereof.

As used herein, "gesture" refers to a tap, a swipe, a drag, a flick, a pinch, and equivalents or combinations thereof.

As used herein, "digit" refers to a thumb, a pointer finger, a middle finger, an index finger, or a pinky finger of a user of a hand-held device. Alternatively, "digit" may refer to a toe.

In a first embodiment, an apparatus of the present disclosure is provided for improving user control of a hand-held device: in this embodiment, the apparatus of the present invention comprises a body configured to conform to a digit; and a member connected to the body adjacent to a distal portion of the digit, so that bringing the member on the body of the apparatus into contact with the relevant structure on the hand-held device transfers force from the digit to the relevant structure, so as to activate a desired response. In some embodiments, the desired response may produce an output on a display portion of the hand-held device.

In some embodiments, the joint comprises a distal inter-phalangeal joint. In some embodiments, the joint comprises a proximal inter-phalangeal joint. In some embodiments, the joint comprises a metacarpo-phalangeal joint.

In some embodiments, when the body is conformed to the digit, the body allows the distal inter-phalangeal joint to move about its complete range of motion. In some embodiments, when the body is conformed to the digit, the body allows the proximal inter-phalangeal joint to move about its complete range of motion. In some embodiments, when the body is conformed to the digit, the body allows the metacarpo-phalangeal joint to move about its complete range of motion. In some embodiments, the body can be configured to conform to an entire digit. In some embodiments, the body can be configured to conform to a portion of a digit. In an embodiment, the portion of the digit comprises a distance between a tip of the digit and the distal inter-phalangeal joint. In an embodiment, the portion of the digit comprises a skin surface surrounding a distal phalanx. In an embodiment, the portion of the digit comprises a distance between a tip of the digit and the proximal inter-phalangeal joint. In an embodiment, the portion of the digit comprises a skin surface surrounding the distal phalanx and a middle phalanx. In an embodiment, the portion of the digit comprises a distance between a tip of the digit and a proximal phalanx. In an embodiment, the portion of the digit comprises a skin surface surrounding the distal phalanx, the middle phalanx, and the proximal phalanx.

In some embodiments, the body can be configured to conform to a portion of the digit comprising a distal phalanx. In some embodiments, the body can be configured to conform to a portion of the digit comprising a middle phalanx. In some embodiments, the body can be configured to conform to a portion of the digit comprising a proximal phalanx. In at least one embodiment, the body can be configured to conform to a portion of the digit comprising the distal phalanx, the middle phalanx, the proximal phalanx, or combinations thereof. In at least one embodiment, the body can be configured to conform to the distal phalanx, the middle phalanx, the proximal phalanx, or combinations thereof, so that when the body is conformed to the digit, the body allows the distal inter-phalangeal joint, the proximal inter-phalangeal joint, and the metacarpo-phalangeal joint to each move about its complete range of motion.

In an embodiment, an apparatus of the present disclosure is provided for improving ergonomics of a hand-held device. In an embodiment, an apparatus for improving ergonomics of a hand-held device increases access to the hand-held device for a user having a physical limitation associated with a hand. In an embodiment, an apparatus for improving ergonomics of a hand-held device improves a user's motor control over the hand-held device. In an embodiment, an apparatus for improving ergonomics of a hand-held device improves a user having a physical limitation associated with a hand's motor control over the hand-held device. In some embodiments, the apparatus for improving ergonomics of a hand-held device comprises a body configured to conform to a digit, and a force transferring member connected to the body adjacent to a distal portion of the digit.

In some embodiments, the apparatus for improving ergonomics of a hand-held device comprises a body configured to conform to a digit, wherein when the body is conformed to the digit, the body allows the digit to move a maximum range of motion through a joint of the digit, and a force transferring member connected to the body, and positioned adjacent to a distal portion of the digit, wherein the positioning of the member adjacent to the distal portion of the digit allows a the digit to remain substantially parallel to a face of the hand-held device when the member transfers force from the digit to the responsive portion of the hand-held device. In some embodiments, the positioning of the member adjacent to the distal portion of the digit allows a longitudinal axis of the digit to remain substantially parallel to a planar surface of the hand-held device when the member transfers force from the digit to the responsive portion of the hand-held device. In some embodiments, the positioning of the member adjacent to the distal portion of the digit allows the distal portion of the digit to remain in substantial alignment with a middle portion of the digit when the member transfers force from the digit to the responsive portion of the hand-held device. In some embodiments, the positioning of the member adjacent to the distal portion of the digit allows the distal portion of the digit to remain in substantial alignment with a middle portion of the digit and a proximal portion of the digit when the member transfers force from the digit to the responsive portion of the hand-held device.

In at least one embodiment, when the member transfers force from a digit to a responsive portion of a hand-held device, the member transforms an unnatural digit movement into a natural digit movement. In an embodiment, an apparatus of the present disclosure is provided for reducing an effective surface area of a tip of the digit. In an embodiment, an apparatus of the present disclosure for reducing an effective surface area of a tip of the digit comprises a body designed to conform to a tip of the digit; and a member situated on the body adjacent to the tip of the digit, wherein the member has a contact surface area less than about half a surface area of an average size tip of the digit so as to reduce the effective surface area of the tip of the digit. In some embodiments, the member has a contact surface area less than about a surface area of a tip of the digit of a user so as to reduce an effective surface area of a tip of the digit. In an embodiment, an apparatus of the present disclosure is provided for reducing a likelihood of receiving an injury to a digit while using a hand-held device. In an embodiment, an apparatus of the present disclosure for reducing a likelihood of receiving an injury to a digit while using a hand-held device comprises a body configured to receive the digit; and a member situated on the body adjacent to a distal portion of the digit, wherein contact between the member and the hand-held device transfers a First force from the digit to the hand-held device while minimizing the impact of a second force transferred from the hand-held device to the digit.

In an embodiment, an apparatus for using a hand-held device includes a body configured to conform to a digit, the body having a proximal end, a distal end, and an opening between the proximal and distal ends for receiving the digit, and a member connected to the body adjacent to a distal portion of the digit, wherein when the digit moves the member into contact with the hand-held device, the member transfers force from the digit to the hand-held device.

In an embodiment, an apparatus for using a hand-held device includes a body configured to conform to a digit, and a member connected to the body adjacent to a tip of the digit, the member being defined by a length and a cross-sectional area sufficient to allow the member to transfer force from the digit to the hand-held device when the digit moves the member into contact with the hand-held device.

In some embodiments, the apparatus further includes one or more additional members situated on the body, wherein bringing each of the one or more additional members into contact with the hand-held device transfers force from the digit to the hand-held device to activate a responsive portion of the hand-held device.

In some embodiments, the member is removable.

In some embodiments, the member is replaceable.

In some embodiments, the member is conformable to various shapes.

In some embodiments, the member is rotatable about its digit.

In some embodiments, the member is pivotable in relation to the user's digit.

In some embodiments, the body extends from a sleeve or other article of clothing (or clothing accessory) of the user.

A primary object of the present invention is to provide an apparatus for aiding in the use of hand-held devices that easily conforms to the user's hand.

Another object of the present invention is to provide an apparatus for aiding in the use of hand-held devices where the apparatus includes a body portion that fits over a finger or thumb and an activation member that is configured to engage a responsive portion of the hand-held device.

Yet another object of the present invention is to provide an apparatus for aiding in the use of hand-held devices where the activation member is movable to certain desired or required positions.

Additional objects of the present invention will appear as the description proceeds.

The present invention overcomes the shortcomings of the prior art by providing an apparatus for aiding in the use of a hand-held device that easily conforms to the circumstanced required by both the user and the various devices with which the user wishes to interact with.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIG. 4A shows a perspective view, of yet another embodiment, of the apparatus of the present disclosure.

FIG. 4B shows a plan view of the apparatus of the present disclosure shown in FIG. 4A.

FIG. 4C shows a side view of the apparatus of the present disclosure shown in FIG. 4A.

FIG. 4D shows a distal end view illustrating a covering of the body of the apparatus of the present disclosure shown in FIG. 4A.

FIG. 4E shows a proximal end view illustrating an opening of the body of the apparatus of the present disclosure shown in FIG. 4A.

DESCRIPTION OF THE REFERENCED NUMERALS

Figure 1A:
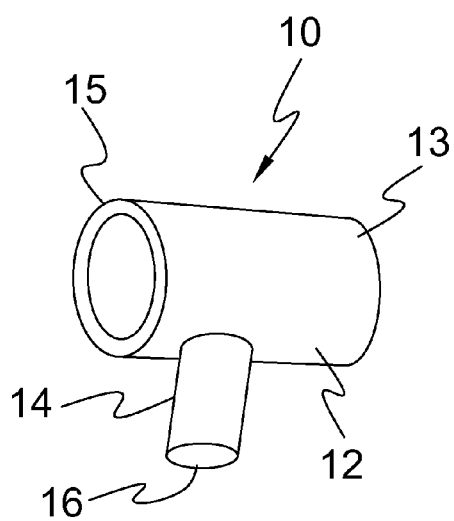
FIG. 1A shows a perspective view, of an embodiment, of the apparatus of the present disclosure.
Figure 1B:
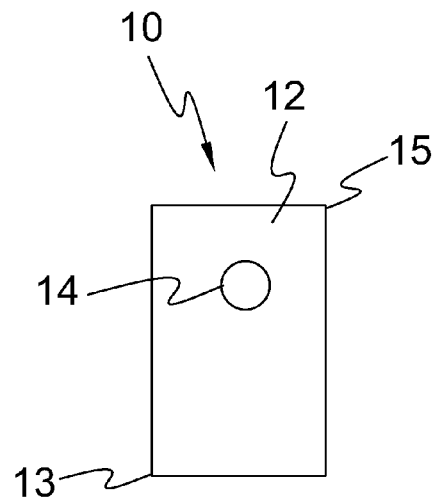
FIG. 1B shows a plan view of the apparatus of the present disclosure shown in FIG. 1A.
Figure 1C:
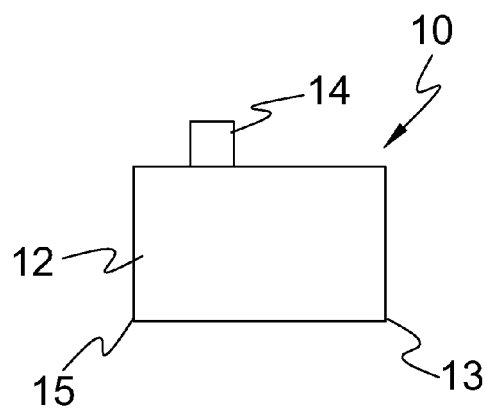
FIG. 1C shows a side view of the apparatus of the present disclosure shown in FIG. 1A.
Figure 1D:
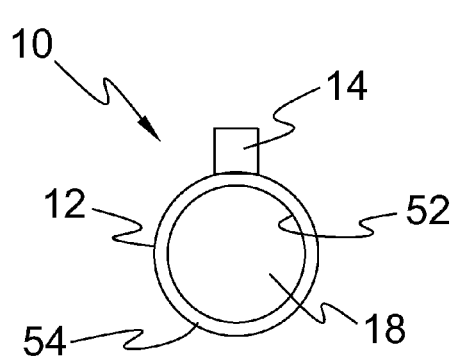
FIG. 1D shows an end view of the apparatus of the present disclosure shown in FIG. 1A.

Turning now descriptively to the drawings, in which similar reference characters denote similar elements throughout the several views, the figures illustrate the various and novel features of the present invention. With regard to the reference numerals used, the following numbering is used throughout the various drawing figures.

10 apparatus
12 body
13 body proximal end
14, 14A, 14B member
15 body distal end
16 member contact surface
17 slot or track
19 body covering
21 fastener recess
23 fastener
24 digit
29 hand-held device
31 hand-held device responsive portion
50 movable member
52 body inner surface
54 body outer surface
X longitudinal axis of body
L member length
A cross-sectional area While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENT

The following discussion describes in detail various embodiments of the present invention. This discussion should not be construed, however, as limiting the invention to those particular embodiments, practitioners skilled in the art will recognize numerous other embodiments as well. For definition of the complete scope of the invention, the reader is directed to appended claims.

FIGS. 1A, 1B, 1C, and 1D show an apparatus 10 that includes a body 12 configured to conform to a digit (not shown), and a member 14, connected to the body 12, for transferring force from a digit to a hand-held device (not shown). Body 12 has an opening 18 extending longitudinally through a central void of the body 12 from the proximal end 13 (FIG. 1D) to the distal end 15 (FIG. 1A). As explained in detail below, placing a digit through the opening 18 allows the body 12 to conform to the digit so that the member 14 can be positioned adjacent to the digit between the digit and the hand-held device. In one embodiment, the member 14 is positioned adjacent to a distal portion of the digit between the digit and the hand-held device. In another embodiment, the member 14 is positioned adjacent to a tip of the digit between the digit and the hand-held device. In yet another embodiment, the member 14 is positioned adjacent to a middle portion of the digit between the digit and the hand-held device. Positioning the member 14 adjacent to the digit between the digit and the hand-held device (not seen in this Figure) allows a user of the apparatus 10 to bring the member 14 into contact with the hand-held device by moving the digit in question. In such a position, as will be discussed below, repeating movements allows member 14 to make repetitive contact with the hand-held device. It will be seen below that any transfer of force that can be performed with the digit itself on the handheld device can be replicated and enhanced by using the member 14 to perform the action. This way, apparatus 10 can be used to transfer force from the digit to the hand-held device to activate a desired response from the hand-held device as if the digit itself were being used. In other words, apparatus 10 functions as an extension of a tip of the user's digit that, like an ordinary tip of the digit, can be used to manipulate a hand-held device and where the apparatus improves user control over the hand-held device.

The body 12 includes an opening 18 extending between the proximal end 13 and the distal end 15, the opening 18 being configured to receive a digit to allow the body 12 to conform to the digit. Body 12 also includes an inner surface 52 and an outer surface 54. It should be appreciated that by conforming to the digit, the body 12 stably fixes itself in regards to the user (as discussed below) so that member 14 is also fixed in relation the user. In this regard, the body 12 functions as a place holder to hold the member 14 in place adjacent to a desired portion of a digit surface. It is believed that the body 12 can accomplish this function when the body 12 is minimally conformed to the digit. In an embodiment, the body 12 can be minimally conformed to the digit by configuring the body 12 to have a first surface in physical contact with a first portion of a digit and a second surface integral to the first surface, the second surface being in physical contact with a second opposite portion of the digit. In other words, the body is capable of conforming to the digit if the body 12 is configured to have at least two opposing surfaces integrally connected to each other wherein each of the opposing surfaces are in physical contact with a digit.

In some embodiments, the body 12 can be configured to minimally conform to a digit. In such embodiments, the body 12 can be designed to be discontinuous circumferentially about the digit. In some embodiments, the body 12 can be configured to maximally conform to a digit. In such embodiments, the body 12 can be designed to be continuous circumferentially about the digit.

In an embodiment, the body 12, can be configured with an opening 18 sized large enough for the opening to receive the digit, yet small enough for the body to fit snugly on the digit. To prepare apparatus 10 for use, the opening 18 receives a digit into the proximal end 13 of the body 12 and the digit may, in some embodiments, extend beyond the distal end 15 of the body 12 so that the digit substantially occupies the entire space in the opening 18 as the body 12 conforms to the digit. By conforming to the digit, body 12 holds the member 14 in a substantially fixed position adjacent to a distal portion of the digit between the digit and a hand-held device. It is believed that flexing the member 14 in position adjacent to the distal portion of the digit allows the user of the apparatus 10 to have improved control over movement of the member 14. That way, the apparatus 10 can be used to manipulate a hand-held device with precision by moving the digit towards a target responsive portion of the hand-held device to activate the desired portion of the hand-held device.

In some embodiments, the body 12 can be configured to conform to an entire digit. In some embodiments, when the body is conformed to the entire digit, a tip of the digit portion is exposed.

In some embodiments, when the body is conformed to the entire digit, a tip of the digit portion is covered. In some embodiments, when the body is conformed to the entire digit, substantially the entire digit occupies the opening between the proximal end 13 and the distal end 15 of the body.

In some embodiments, the body 12 can be configured to conform to a portion of the digit. In one example, the portion of the digit conformed to comprises a distance between the tip of the digit and the distal inter-phalangeal joint. In another embodiment, the portion of the digit may comprise the distance between the tip of the digit and the proximal inter-phalangeal joint. In another embodiment, the portion of the digit conformed with may comprise the distance between the tip of the digit and the proximal phalanx.

In some embodiments, the body can be configured to conform to a portion of the digit comprising a distal phalanx, so that the distal phalanx substantially occupies the opening 18 from the proximal end 13 to the distal end of the body. In some embodiments, the body can be configured to conform to a portion of the digit comprising a middle phalanx, so that the middle phalanx substantially occupies the opening 18 from the proximal end 13 to the distal end 15 of the body. In some embodiments, the body can be configured to conform to a portion of the digit comprising a proximal phalanx, so that the proximal phalanx substantially occupies the opening 18 from the proximal end 13 to the distal end 15 of the body. In at least one embodiment, the body can be configured to conform to a portion of the digit comprising the distal phalanx, the middle phalanx, the proximal phalanx, and portions or combinations thereof. In at least one embodiment, the body can be configured to conform to the distal phalanx, the middle phalanx, the proximal phalanx, and portions or combinations thereof, so that when the body is conformed to the digit, the body allows the distal inter-phalangeal joint, the proximal inter-phalangeal joint, and the metacarpo-phalangeal joint to each move about their complete ranges of motion.

It should be appreciated that, because contact surface 16, shown in FIG. 1A, of member 14 can be designed to have a surface area about the same size or less than the surface area of the corresponding responsive portion of a hand-held device, a user of the apparatus 10 can activate a target responsive portion of the hand-held device with decreased chances of activating an adjacent non-target responsive area (such as an adjacent key). As such, apparatus 10 of the present disclosure can be used to improve accuracy and user control of a hand-held device.

Figure 2:
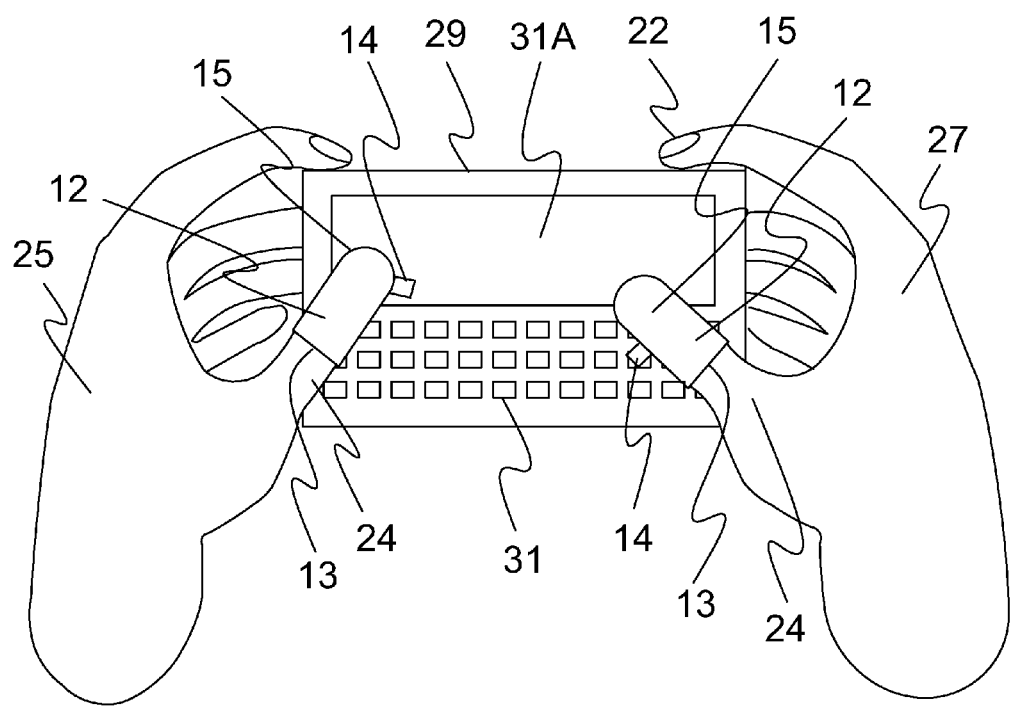
FIG. 2 shows a perspective view, of an embodiment, of the apparatus of the present disclosure being used to control a hand-held device.

In some embodiments, opening 18 can be configured to receive a thumb (as seen in FIG. 2 and discussed below) to allow the body 12 to conform thereto for subsequent use of the apparatus 10 for control of a hand-held device. In other embodiments of the present invention, the opening 18 may be conformed to fit any of the fingers/digits on the user's hand: pointing finger, middle finger, ring finger, and the like.

In certain embodiments, opening 18 can be configured to receive an artificial digit or thumb. The prosthetic digit could be either an artificial, prosthetic, or bionic (computer assisted) type of mechanical aid.

In general, opening 18 can be provided with any cross-sectional area suitable for accommodating a digit. The cross-sectional area of the opening 18 can be designed to accommodate a specific digit based on a range of average size digits. The cross-sectional area of the opening 18 can be designed to accommodate a specific digit of a particular user. The cross-sectional area of the opening 18 can be designed to accommodate a specific digit based on a range of atypical size digits.

In all cases, the opening 18 may be provided to fit any size digit as desired, either average sized, or above or below average sized, as needed. Additionally, it is contemplated that the body 12 would be made of flexible or semi-flexible material, to allow it to conform to various anomalous shapes of certain user's digits, such as abnormally large or swollen knuckles, for instance.

In some embodiments, the opening 18 comprises a void extending from the proximal end 13 to the distal end 15 of the body 12. In such embodiments, the void has a volume of about the volume of a digit to be received in the opening 18. In various embodiments, the void has a volume of about the volume of an average small size digit, an average medium size digit, an average large size digit, a below average small size digit, an above average small size digit, a below average medium size digit, an above average medium size digit, a below average large size digit, an above average large size digit, an average extra small size digit, or an average extra large size digit.

It should be appreciated that the body 12 can be formed having any shape or dimensions sufficient to allow the opening 18 to receive a digit so that the body 12 can conform to the digit (e.g., thumb, pointer, middle, index, pinky). In an embodiment, body 12 has a tubular shape. In an embodiment, body 12 has a cylindrical shape. In an embodiment, body 12 has a rectangular shape. In an embodiment, the body 12 has an irregular shape. In an embodiment, the body 12 has a symmetrical shape. In an embodiment, the body 12 has an asymmetrical shape. In embodiments, the body 12 can be formed having a custom shape suitable to conform to a particular type of digit (e.g., thumb, index, middle, ring, and pinky).

The body 12 can be formed using any material capable of allowing the body 12 to conform to a digit (e.g., thumb, index, middle, ring, and pinky). Examples of suitable materials include, but are not limited to a moisture resistant material, a soft-impact material, an insulative material, a non-conductive material, a non-metallic material, a non-magnetic material, a dull material, an inert material, an organic material, an inorganic material, a moldable material, a flexible material, a rigid material, a resilient material, an elastic material, a metallic material, a magnetic material, a wooden material, a ceramic material, or combinations and equivalents thereof.

In some embodiments, the thickness of the body 12 can be custom designed as desired. In some embodiments, the longitudinal length of the body 12 from the proximal end 13 to the distal end 15 can be custom designed depending on the digit length of the particular user. In such embodiments, the body 12 length allows the body 12 to conform to and cover substantially the entire length of the digit. In other such embodiments, the body 12 length allows the body 12 to conform to and cover only a portion of the entire length of the digit. In some embodiments, the thickness of the body 12 can be custom designed depending on a comfort level of the particular user. In such embodiments, a body 12 having a substantial thickness can be provided for use in colder climates. In such embodiments, a body 12 having a minimal thickness can be provided for use in warmer climates.

Although FIGS. 1A, 1B, 1C, and 1D show the apparatus 10 of the present disclosure having body 12 that continuously conforms circumferentially about a digit from the proximal end 13 to a distal end of the body 12, the body 12 can be discontinuous about the circumference of the digit from the proximal end 13 to the distal end 15 of the body 12 (not shown). For example, the body may appear to have a horseshoe-like configuration when viewed from either the proximal end 13 or the distal end 15 of the body. In some embodiments, the body 12 can be discontinuous from the proximal end 13 to the distal end 15 of the body longitudinally along the digit. In some embodiments, the body 12 can be discontinuous both longitudinally along the length of the digit and circumferentially about the digit so that only portions of the body 12 conform to the digit, so long as the body 12 can conform to the digit and member 14 can be situated on the body 12 in a way that allows the member 14 to transfer force from the digit to a hand-held device.

Figure 3:
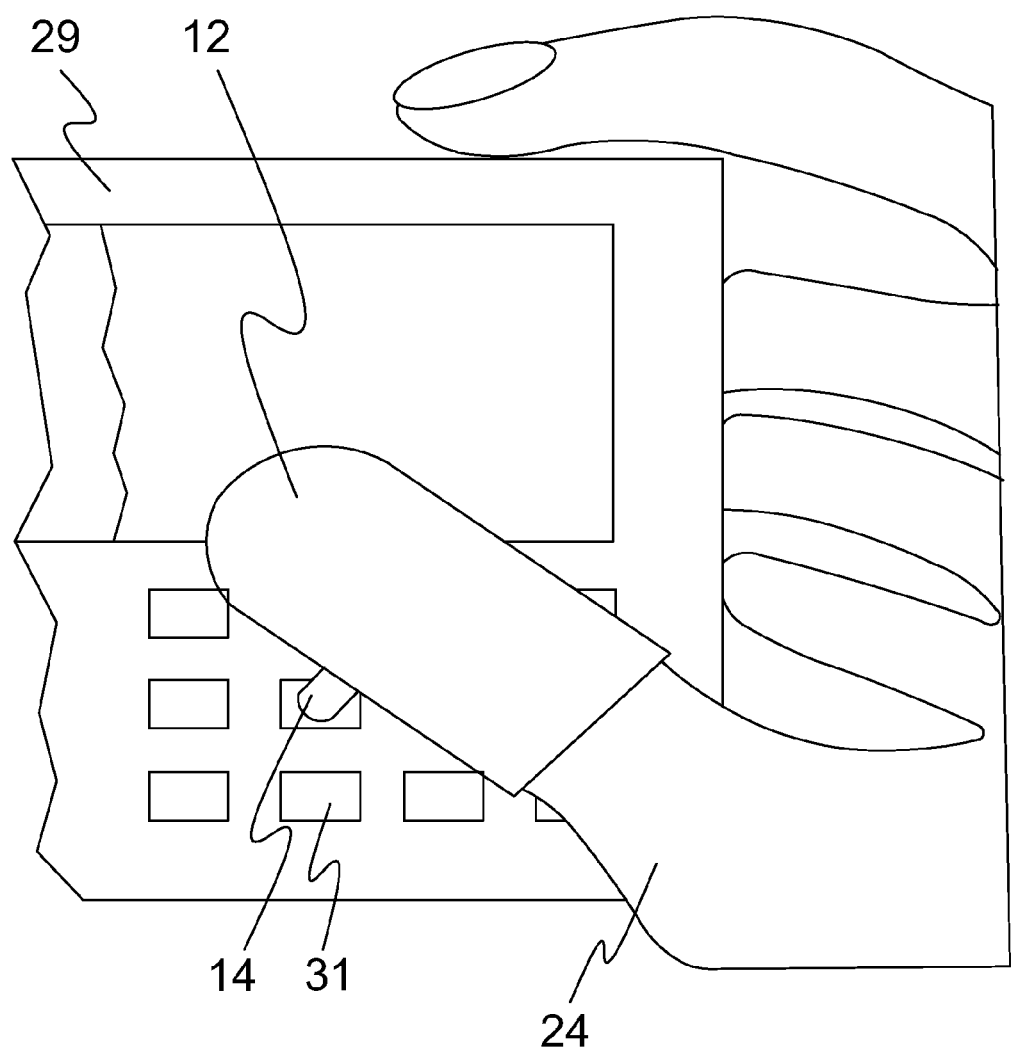
FIG. 3 shows a close-up perspective view, in accordance with an embodiment, of a member of the apparatus of the present disclosure being used to contact a responsive portion of a hand-held device.

FIG. 2 shows the apparatus 10 of the present disclosure being used to control a hand-held device 29. FIG. 3 shows a close-up partial perspective view of the apparatus 10 shown in FIG. 2 highlighting the member 14 being used to contact a responsive portion 31 of the hand-held device 29. As shown in FIG. 2 and FIG. 3, the apparatus includes a body 12 configured to conform to a digit 24 (in this case the thumb), and a member 14 for transferring force from the digit 24 to the hand-held device 29, so as to activate a responsive portion 31 of the hand-held device 29. Illustrative of the various modes of operation of apparatus 10, FIG. 2 shows that a plurality of apparatuses 10 can be used at about the same time to improve user control of a hand-held device. In some embodiments, one or more apparatuses 10 can be used at about the same time on one hand (not shown). In other embodiments, as illustrated in FIG. 2, one or more apparatuses 10 can be used at about the same time, one on each hand.

The member 14 can generally be used to transfer force from a digit to multiple responsive portions of a hand-held device, as well as multiple types of responsive portions of a hand-held device. In one embodiment, as shown in FIG. 2 and FIG. 3, a body 12 as conformed to thumb 24 of right hand 27 is being used to position member 14 between the thumb 24 and the hand-held device 29. In this instance, the member 24 is shown transferring force from the thumb 24 to a first responsive portion 31 of the hand-held device 29 to activate a key (e.g., button) of the hand-held device. In another embodiment shown in FIG. 2, a body 12 as conformed to thumb 24 of left hand 25 is being used to position member 14 between the thumb 24 and the hand-held device 29. In this instance, the member 24 is shown transferring force from the thumb 24 to a second responsive portion 31A of the hand-held device 29 to activate a touchscreen of the hand-held device.

Those of skill in the art will appreciate that the responsive portion of the hand-held device varies between device types, manufacturers, models, or the like. By way of illustration, and not of limitation, for example, the responsive portion of a hand-held device, such as a Smartphone, having a Qwerty keyboard includes any buttons or keys of the Qwerty keyboard itself; however, the responsive portion may also include a trackball, a scroll wheel, or a switch. For a hand-held device having a touchscreen, the responsive portion may include any portion of the touchscreen that performs an action on the hand-held device in response to touching that particular portion, including a virtual key from an onscreen virtual Qwerty keyboard. Touchscreen-enabled devices can provide a robust graphical user interface that allows a user to interact with the device by touching, dragging, and pointing at displayed elements on a touchscreen. Applications can be launched by tapping on an icon from a launch screen. While an application is open, the touchscreen is used to both display output to the user and to accept user input. An example of a mobile device equipped with such a touchscreen is the IPHONE®, available from Apple Inc. of Cupertino, Calif.

The responsive portion 31 of the hand-held device 29 can be activated by using the member 14 to perform any action on the hand-held device that can be performed without apparatus 10 by mere use of a digit. In some embodiments, the responsive portion of the hand-held device can be activated by using the member to perform a gesture on the hand-held device. In an embodiment, the gesture is a tap. In an embodiment, the gesture is a swipe. In an embodiment, the gesture is a drag. In an embodiment, the gesture is a flick. In an embodiment, the gesture is a pinch. In one embodiment, the gesture includes a tap, a swipe, a drag, a flick, a pinch, and equivalents or combinations thereof. In some embodiments, the member 14 can be used to perform a gesture on the hand-held device. In certain embodiments, performing a gesture on the hand-held device triggers a user intended response of the hand-held device.

FIGS. 4A, 4B, 4C, 4D, and 4E show another embodiment of apparatus 10. As shown in FIGS. 4A-4D, the body 12 can be provided with a covering 19 at the distal end 15 of the body 12 to minimize displacement of the body from its position as conformed to the digit. Covering 19 is designed so that when a user places a digit through opening 18 (shown in FIG. 4E), the digit extends longitudinally through the center of the body 12 until it reaches covering 19 so that the covering 19 is adjacent to a tip of the digit of the user. In some embodiment, covering 19 can be used to enhance conforming of the body 12 to the digit. In such embodiments, covering 19 reduces displacement of body 12 from its original position on the digit. In an embodiment, covering 19 reduces slippage of the body 12 while the apparatus 10 is being used. In such embodiments, reducing slippage of the body 12 reduces slippage of the member 14 as the member 14 makes contact with the hand-held device, thereby improving accuracy of the apparatus 10. In an embodiment, covering 19 can prevent slippage of the body 12 while the apparatus 10 is being used to improve accuracy of the apparatus.

Generally, the body 12 holds the member 14 in place on the body adjacent to a distal portion of a digit between the proximal end 13 and the distal end 15 of the body. In another embodiment (seen in this case, in FIG. 6), additional members 14A and 14B are seen located on the body 12. It should be understood that these additional members 14A and 14B way be located on any portion of the body 12 that would be helpful in specific cases regarding the hand-held device design and the user's inclinations or limitations.

Figure 5:
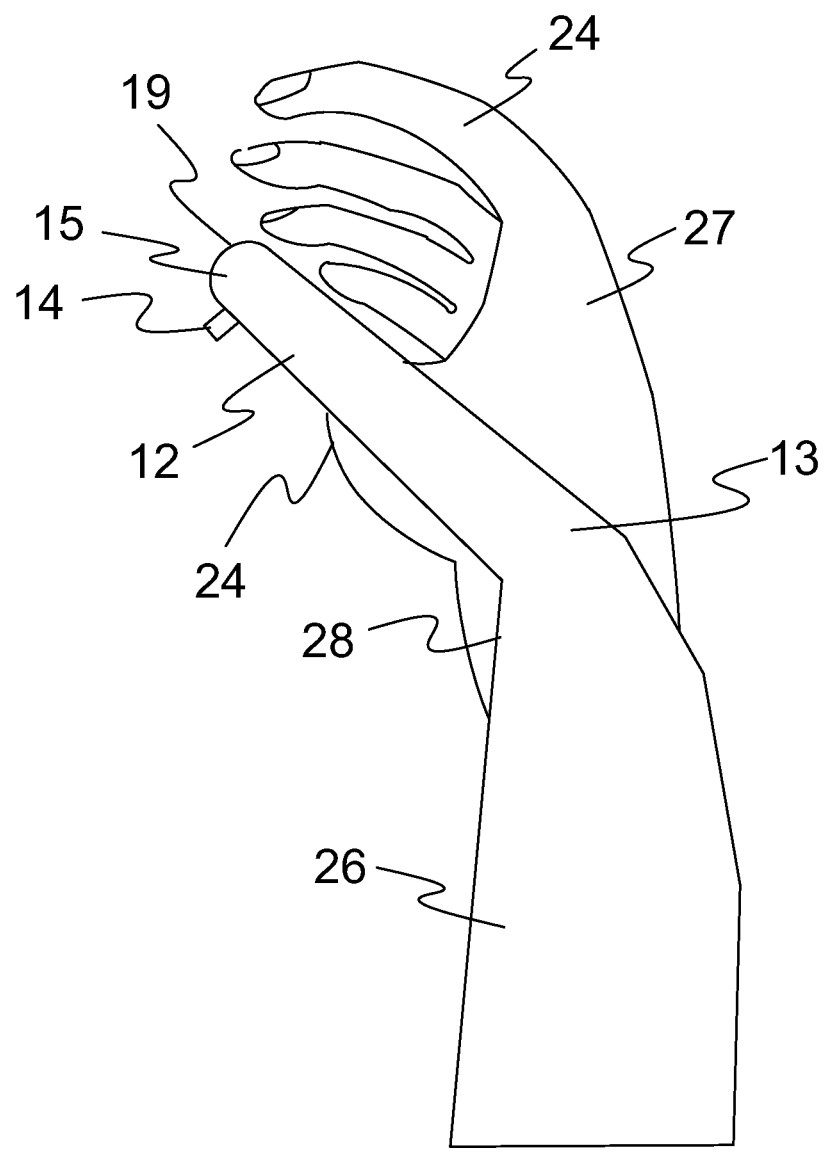
FIG. 5 shows a perspective view, in accordance with another embodiment, of the apparatus of the present disclosure.
Figure 6A:
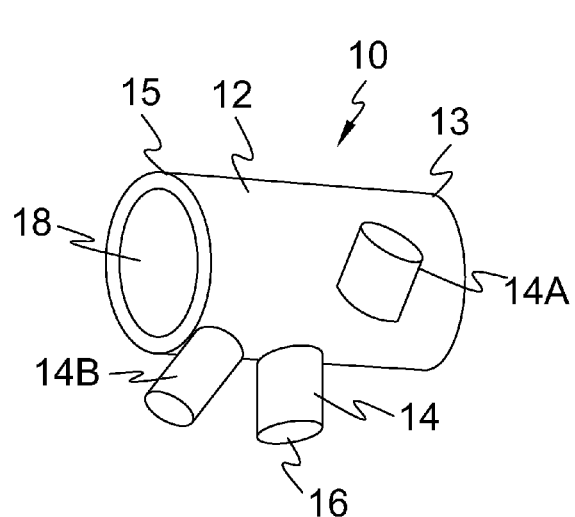
FIG. 6A shows a perspective view, of another embodiment, of the apparatus of the present disclosure.
Figure 6B:
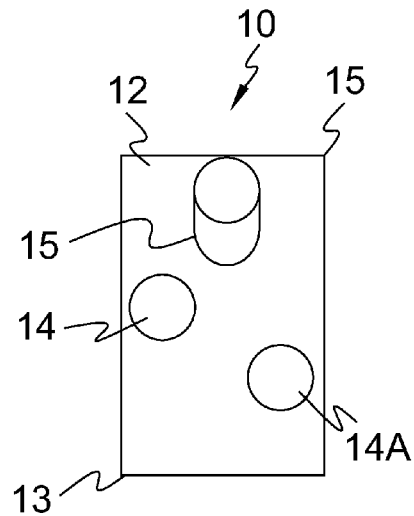
FIG. 6B shows a plan view of the apparatus of the present disclosure shown in FIG. 6A.
Figure 6C:
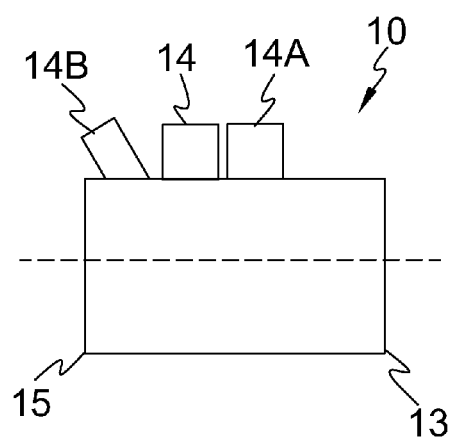
FIG. 6C shows a side view of the apparatus of the present disclosure shown in FIG. 6A.
Figure 6D:
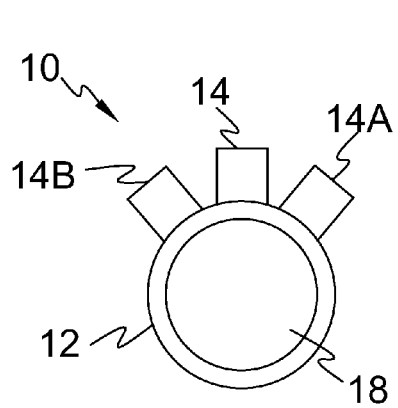
FIG. 6D shows an end view of the apparatus of the present disclosure shown in FIG. 6A.

FIG. 5 shows another embodiment of apparatus 10. It should be appreciated that the embodiment as shown in FIG. 5 works in substantially the same manner as described elsewhere herein. As shown in FIG. 5, apparatus 10 includes a body 12 configured to conform to a digit 24, a member 14 connected to the body 12 adjacent to a distal portion of the digit 24 for transferring force from the digit to a hand-held device (not shown), and a sleeve (or other article of clothing or clothing accessory) 26 connected to the proximal end 13 of the body 12 for helping the body 12 conform to the digit 24. In FIG. 5, body 12 is shown as extending from sleeve (or other article of clothing or clothing accessory) 26 and is shown as being integrated with the body 12 so that sleeve (or other article of clothing or clothing accessory) 26 and body 12 form a single element, however, sleeve (or other article of clothing or clothing accessory) 26 may be a distinct and separate element from the body 12. In the latter case, sleeve (or other article of clothing or clothing accessory) 26 can be connected to the body 26 by any suitable means (e.g., adhesive, sewn, fastened, clipped, etc.).

The body 12 can be configured to conform to any digit on any hand. FIG. 5 shows the body 12 configured to conform to a thumb 24 on a right hand 27, however, it should be appreciated that the body 12 can be configured to conform to a thumb 24 on a left hand (not shown), or to any other finger on either hand that is desired.

Although FIG. 5 shows covering 19 at distal end 15 of the body 12, it should be appreciated that the body 12 can also be designed so that opening 18 extends to the distal end 15 to leave the tip of the digit exposed such as those embodiments shown in other Figs.

FIGS. 6A, 6B, 6C, and 6D show an embodiment of the apparatus 10 of the present disclosure in which the body 12 includes a plurality of members 14 situated on the body 12. In an embodiment, one or more additional members are situated on the body 12 between the proximal end 13 and the distal end 15. These members are indicated at 14A and 14B. It should be noted that though only two additional members are seen in the Fig. that more or less could easily be utilized. These additional members enhance the functionality of the apparatus 10 and allow for finer control in certain circumstances. By way of illustration, and not of limitation, the physical space surrounding a particular responsive portion of a Smartphone having a Qwerty keyboard is limited so that only a single tip of the digit can occupy such space. Actually, a single tip of the digit occupies the space of a plurality of responsive portions of the typical Smartphone making it difficult to activate one among the plurality of responsive portions without inadvertently activating adjacent responsive portions. By providing multiple members 14 on the body 12, each member having a cross-sectional contact surface area about the same area as the responsive portions of the Qwerty keyboard of the Smartphone, apparatus 10 can be used to increase the effective number of tip of the digits occupying the physical space surrounding the plurality of responsive portions. For example, whereas an actual tip of the digit may occupy the entirety of the physical space of about four keys of a Qwerty keyboard of a typical Smartphone hand-held device, providing a body 12 having four members 14 situated on the body adjacent to each other, allows the apparatus to effectively place the equivalent of four tip of the digits in the space previously occupied by a single tip of the digit. This way, each of the responsive portions of the hand-held device adjacent to each other among a plurality of adjacent responsive portions of the hand-held device can be contacted with precision with a different member 14, without simultaneously contacting an adjacent member 14. By increasing the accuracy of consecutively contacting adjacent responsive portions of a hand-held device occupying limited physical space, apparatus 10 provided with a plurality of members 14 can substantially increase the speed of using the hand-held device.

In some embodiments, a plurality of members 14, 14A, 14B situated on the body 12 have a space between them to reduce the likelihood of multiple members activating (e.g., transferring force) to a single responsive portion of a hand-held device. In some embodiments, the space between the members comprises a distance equivalent to about a distance between adjacent responsive portions of a hand-held device.

As shown in FIGS. 6A, 6B, 6C, and 6D, the plurality of members 14 generally can be situated on the body 12 in any position along the longitudinal length of the body 12 between the proximal end 13 and distal end 15 of the body 12. Although FIGS. 6A-6D show the three members 14 situated at random on the body 12, the plurality of members 14 can be positioned in any desired array on the body 12.

As illustrated in FIGS. 6A-6D the plurality of members 14 can generally be oriented at any angle with respect to a plane formed along a longitudinal axis of the body 12. In some embodiments, each member 14 can be oriented at the same angle with respect to the plane formed along the longitudinal axis of the body 12. In certain embodiments, each member 14 can be oriented at different angles with respect to the plane formed along the longitudinal axis of the body 12. In other embodiments, some members 14 can be oriented at the same angles while other members 14 can be oriented at different angles with respect to the plane formed along the longitudinal axis X of the body 12 (shown in FIG. 6C). In such embodiments, the member can be oriented an angle of up to about 90° (e.g., up to about 0°, up to about 5°, up to about 10°, up to about 15°, up to about 20°, up to about 25°, up to about 30°, up to about 35°, up to about 40°, up to about 45°, up to about 50°, up to about 55°, up to about 60°, up to about 65°, up to about 70°, up to about 75°, up to about 80°, up to about) 85°, with respect to the central longitudinal axis of the body 12. It should be appreciated that the general teachings with respect to the angle of orientation of the plurality of members 14 described here may apply equally to other embodiments in which a single member 14 is situated on the body.

Figure 7:
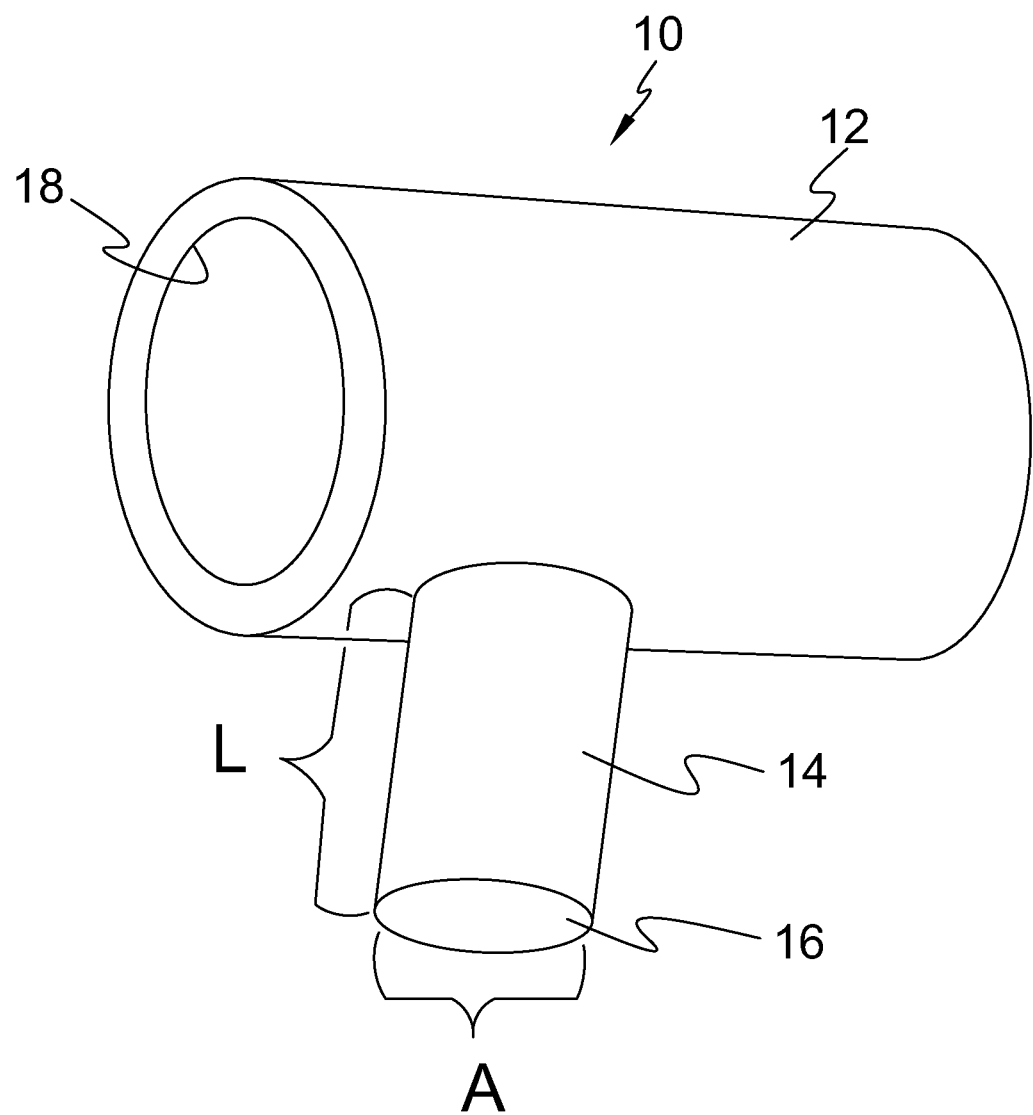
FIG. 7 shows a close up perspective view, in accordance with an embodiment, of the member of the apparatus of the present disclosure.

FIG. 7 shows a close-up view of the member 14 of the apparatus 10 of the present disclosure. As shown in FIG. 7, the member 14 is made of an appropriate material and is defined by a length L and a cross-sectional area A sufficient to allow the member 14 to transfer force from a digit to a hand-held device so that the force transferred is focused onto a responsive portion of the hand-held device. It should be appreciated that the dimensions L and A can modified as desired as the member 14 is not intended to be limited in this manner, so long as the member is capable of transferring force from the digit to the responsive portion of the hand-held device as described previously. In an embodiment, the minimum value of dimension L is 1 mm. In an embodiment, the minimum value of A is ≤0.5 square mm.

Figure 8:
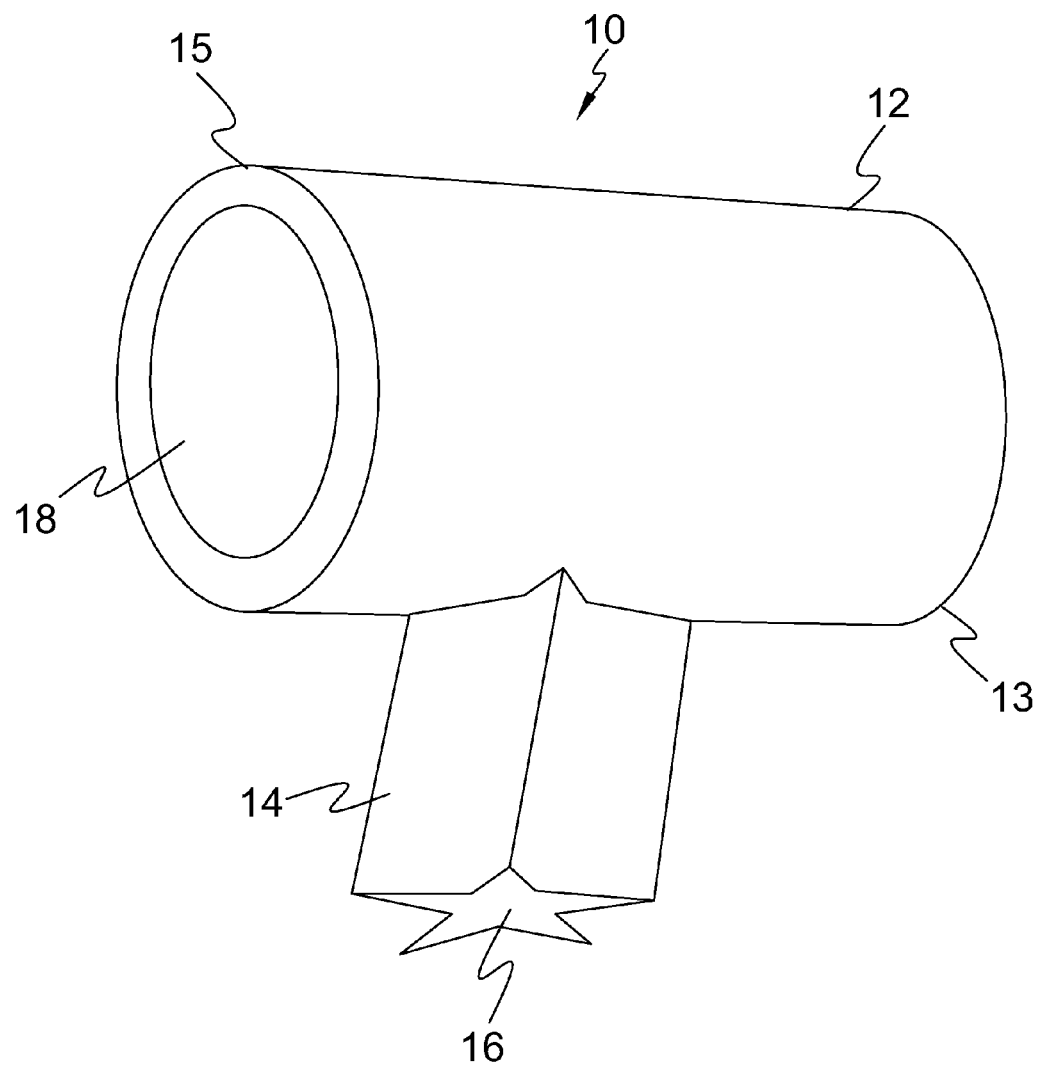
FIG. 8 shows a perspective view, of another embodiment, of the apparatus of the present disclosure.

FIG. 8 shows an embodiment of apparatus 10 in which the cross-sectional shape of the member 14 comprises a star. However, the member 14 can be provided with any cross-sectional shape sufficient to allow the member to transfer force from a digit to a hand-held device so that the force transferred is focused onto a responsive portion of the hand-held device. In an alternative embodiment, a user of the apparatus 10 can visit an internet website and design a member 14 having a personalized shape for subsequent purchase.

The member 14 can be formed having any dimensions that would allow the member 14 to transfer enough force from a digit to a hand-held device to perform an action on the hand-held device. It is believed that when the area of the member 14 matches the area of the responsive portion of the hand-held device, a user of the apparatus has a better chance of activating an intended responsive portion of the hand-held device rather than an unintended responsive portion of the hand-held device. In some embodiments, the member 14 can be provided with a cross-sectional area that is about the same size as the area of a key on a Smartphone. By way of illustration, and not of limitation, a user of a BLACKBERRY® Smartphone can order an apparatus 10 having a member 14 preconfigured with a cross-sectional area about the same size as the surface area of the keys on the BLACKBERRY® Smartphone. In removable and replaceable embodiments described in detail below, the member 14 can be removed and replaced to increase or decrease the cross-sectional area of the member 14 so that the member 14 has about the same size area as the responsive portion surface area of a particular hand-held device.

In other embodiments, the cross-sectional area of a member 14 is narrower than the surface area of a responsive portion of the hand-held device. In an embodiment, the cross-sectional area of the member 14 is narrower than the surface area of a button of the hand-held device so that when member 14 comes into contact with the button of the hand-held device the member 14 can activate the button without touching any adjacent buttons.

The member 14 can be made from any material capable of transferring force from a digit to the hand-held device as force from the digit pushes the member into contact with the hand-held device. It should be appreciated that any material that allows the member 14 to focus the transferred force onto the responsive portion of the hand-held device can be used to form the member 14. In some embodiments, the member 14 can be made from substantially the same material as the body 12 so that the member 14 and the body 12 have similar properties. In other embodiments, the member 14 can be made from substantially different material as the body 12 so that the member 14 and the body 12 have dissimilar properties. Examples of suitable materials include, but are not limited to a moisture resistant material, a soft-impact material, an insulative material, a non-conductive material, a non-metallic material, a non-magnetic material, a dull material, an inert material, an organic material, an inorganic material, a moldable material, a flexible material, a rigid material, a resilient material, an elastic material, a metallic material, a magnetic material, a wooden material, a ceramic material, or combinations and equivalents thereof. It should be appreciated that multiple materials can be used to form the member 14. It should also be appreciated that the materials can be combined in various ways to form the member 14. In some embodiments, materials used to form the member 14 can be layered upon one another. In some embodiments, materials used to form the member 14 can be intertwined upon one another. In some embodiments, materials used to form the member 14 can provide the member 14 with structural symmetry so that properties are uniform throughout the member 14. In some embodiments, materials used to form the member 14 can provide the member 14 with structural asymmetry, so that properties are not uniform throughout the member 14. In one embodiment, the member 14 includes a spring embedded within the member 14 to increase the force transferred from the digit to the responsive portion of the hand-held device. In one embodiment, the member 14 includes a spring embedded within the member 14 to decrease the force needed to activate a responsive portion of a hand-held device.

In some embodiments, the surface 16 of member 14 comprises a planar surface having a surface area equal to or less than the surface area of an average size alphanumeric key of an alphanumeric keypad on a cellular phone. In certain embodiments, the planar surface 16 of member 14 is parallel to the digit upon which the body 12 of the apparatus 10 is configured to conform to. In certain embodiments, the planar surface 16 of member 14 is not parallel to the digit upon which the body 12 of the apparatus 10 is configured to conform to. In some embodiments, the surface 16 of member 14 comprises a concave surface. In some embodiments, the surface 16 of member 14 comprises a convex surface. In some embodiments, the surface 16 of member 14 comprises a rimmed surface. In some embodiments, the surface 16 of member 14 comprises a textured surface. In an embodiment, the textured surface comprises a sandpaper-like surface for increasing friction between a responsive portion of a hand-held device and the surface 16. It is believed that increased friction can result in reduced slippage and greater accuracy per stroke. In an embodiment, the textured surface comprises an abrasive surface. In some embodiments, the surface 16 of member 14 comprises a finished surface. In an embodiment, the finished surface comprises a smooth surface. In an embodiment, the finished surface comprises a rough surface. In an embodiment, the finished surface comprises a polished surface. In some embodiments, the surface 16 of member 14 comprises an abrasive surface.

In certain embodiments, the surface 16 can be provided with a coating. For example, the surface 16 can be provided with a coating designed to protect the surface of the hand-held device. Coating the surface 16 of the member 14 with a protective coating can be particularly useful when the member 14 is being used to transfer force from a digit to a sensitive surface on a hand-held 10 device, such as a touchscreen. By providing a protective coating, such as a non-abrasive finish, or a scratch resistant tip, or a felt tip, for example, the protective coating on the surface 16 can minimize damage to the surface of the hand-held device. Providing a member having a surface with a protective coating may be advantages for use with hand-held devices with touch sensitive responsive portions.

Figure 9A:
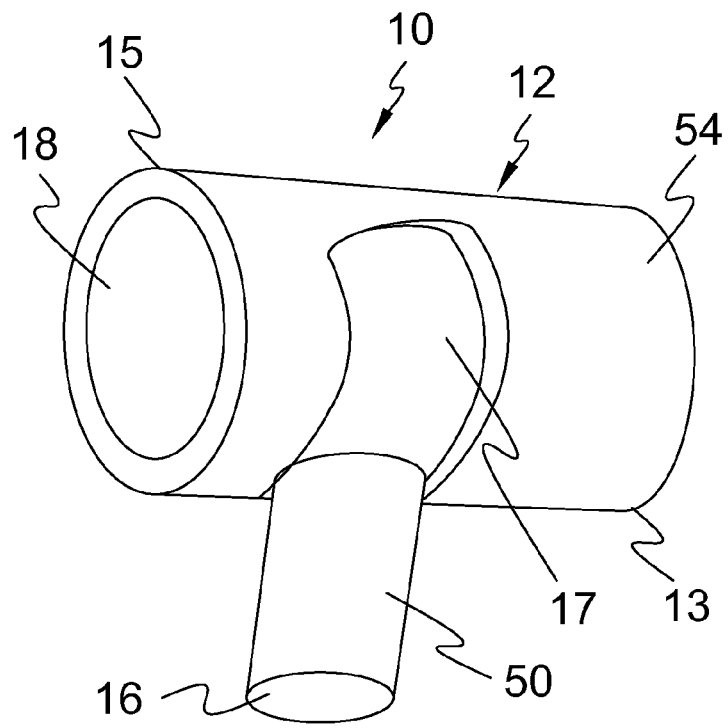
FIG. 9A shows a perspective view, in accordance with an embodiment, of a movable member in a first position situated in a groove on the body of the apparatus of the present disclosure.
Figure 9B:
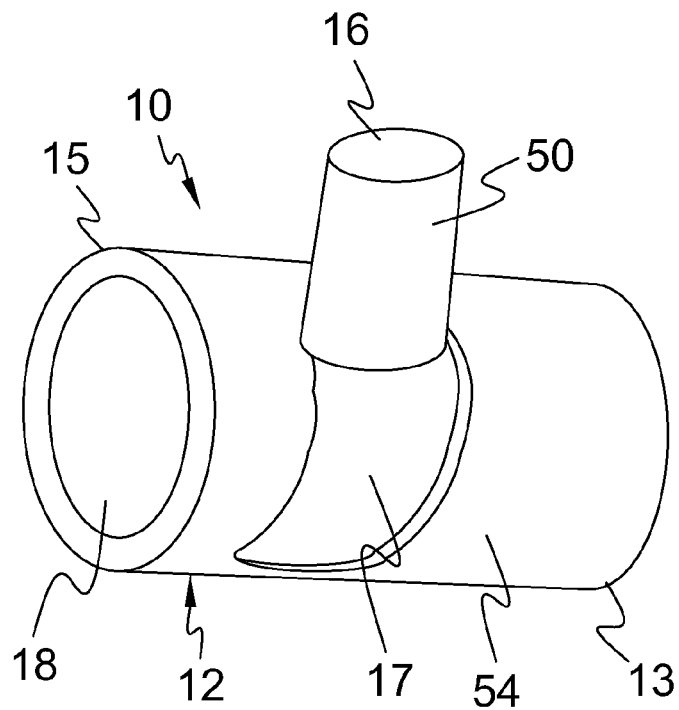
FIG. 9B shows an alternative perspective view of the embodiment shown in FIG. 9A, illustrating the movable member in a second position situated in the groove on the body of the apparatus of the present disclosure.

FIGS. 9A and 9B show perspective views of another embodiment of the apparatus 10 of the present disclosure. As shown in FIGS. 9A and 9B, an apparatus 10 of the present disclosure can include a movable member 50. FIG. 9A shows the movable member 50 positioned in a first position in a track or groove 17 on the body 12. Track or groove 17 is located on the body outer surface 54 as shown. FIG. 9B shows the movable member 50 positioned in a second position in the groove 17 on the body 12 shown in FIG. 9A. The groove 17 allows member 50 to be moved circumferentially about the body 12 so that the user of the apparatus 10 can position the member 50 as desired on the body 12. It should be appreciated that the groove 17 can be located on the body 12 at any distance between the proximal end 13 and the distal end 15 of the body 12. In this embodiment, the member 50 is circumferentially movable about a portion of the body from a first position as shown in FIG. 9A to a second position as shown in FIG. 9B. In another contemplated embodiment, the member 14 can be rotated a complete 360° about the body beginning at a first position and ending at the first position (not shown).

In other embodiments, the body 12 can be provided with multiple grooves or slots intersecting with each other to form a gear-shift or joystick like adjustable member 14 (not shown). In such embodiments, the member 14 can be adjusted to allow the user 10 of the apparatus to position the member 14 in a preferred location on the body 12 to enhance the comfort and performance of the apparatus 10.

In other embodiments (not shown), the apparatus 10 of the present disclosure can include a pivotable member 14 that has a central axis of rotation disposed within the body 12 and pivotably moves in any of 360° of rotation and in any direction above the surface of the body 12. The pivotable member 14 can be situated at any position along the longitudinal length of the body 12 from the proximal end 13 to the distal end 15. The pivotable member 14 allows a user of the apparatus 10 to customize the orientation or angle of the member 14 with respect to the planar surface of the body 12 as conformed to the digit. This way, the pivotable member 14 provides a user of the apparatus 10 with total control over the orientation of the member 14 so that the user can optimize comfort while using the apparatus 10 and optimize control over a hand-held device.

Figure 10A:
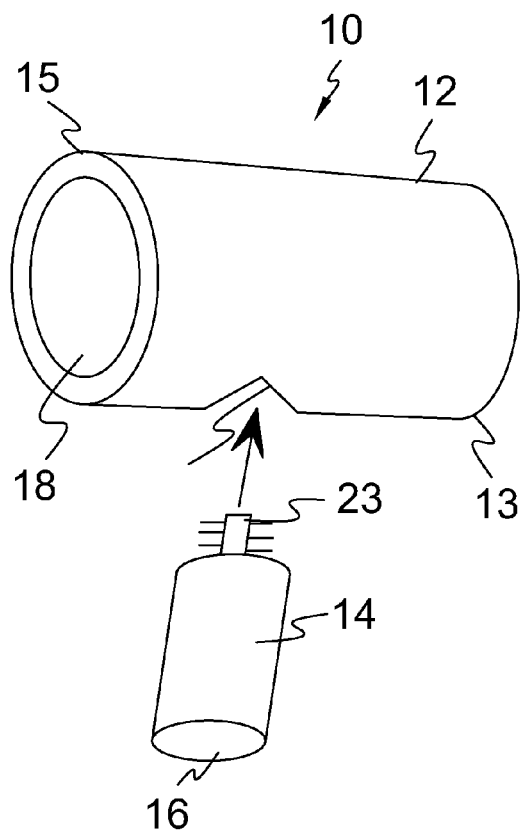
FIG. 10A shows a perspective view of a member being connected to a body, in accordance with an embodiment, of the apparatus of the present disclosure.
Figure 10B:
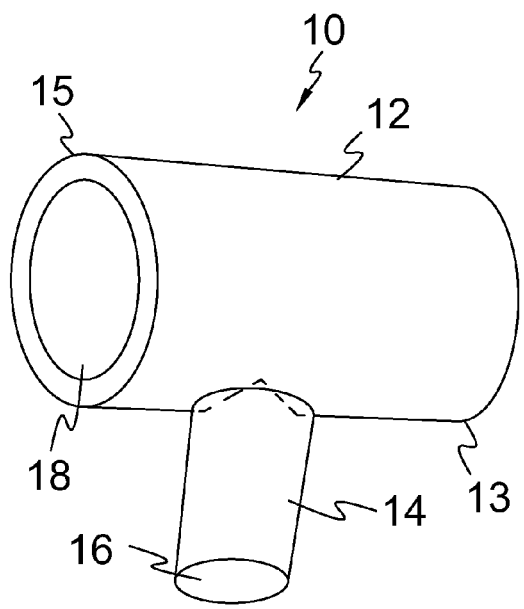
FIG. 10B shows a perspective view of the member in FIG. 10A after being connected to the body, in accordance with an embodiment, of the apparatus of the present disclosure.

FIGS. 10A and 10B show perspective views of another embodiment of the apparatus 10 of the present disclosure in which the member 14 is removable. As shown in FIG. 10A, removable member 14 includes a fastener 23 and a surface 16. Any fastener 23 capable of removably connecting the member 14 to the body 12 can be used. Examples of suitable fasteners include, but are not limited to an adhesive, a screw, a clip, a snap, a hook, a magnet, a latch, a friction mechanism, or VELCRO®. In an embodiment, the removable member 14 is connected to the body 12 by positioning the fastener 23 into a recess 21. In an embodiment, the recess 21 can be situated anywhere along the longitudinal length of the fastener 23 from the proximal end 13 to the distal end 15. FIG. 8B shows removable member 14 removably connected to the body 12. In an embodiment, the member 14 is removable. In such embodiments, the member 14 can be detached and removed from the body 12. In an embodiment, the member 14 is replaceable. In such embodiments, the member 14 can be detached and removed from the body 12, and subsequently replaced with another member 14. In an embodiment, the member 14 is relocatable (not shown) from a first position on the body 12 to a second position on the body 12. By making the member 14 relocatable on the body 12, a user of the apparatus 10 of the present disclosure can place the member 14 on the body 12 in a position that is most effective for the user to manipulate and improve user control of the hand-held device. In an embodiment, the relocatable member 14 allows the user to custom position the member 14 anywhere on the body 12 between the proximal end 13 and the distal end 15.

As noted above, in some embodiments, the removable member 14 allows a first member 14 to be removed and replaced with a second member 14. In some embodiments, the first member 14 and the second member 14 can be substantially the same (e.g., replaceable). In other embodiments, the first member 14 and the second member 14 can be different (e.g., interchangeable, upgradable). For example, when a user of the apparatus 10 changes hand-held devices, the user may remove first member 14 having a first diameter, and replace the first member 14 with a second member 14 having a second diameter.

Without wishing to be bound by theory, it is believed that individuals with a physical limitation associated with the hand or wrist, such as carpal tunnel syndrome, or other neuromuscular or arthritic disorders, have decreased access to hand-held devices. For instance, a physical limitation of the hand or neuromuscular or arthritic disorder can make it difficult for an individual to exercise sufficient motor control of their digits to precisely stroke the miniature responsive portions typically used to interface with a hand-held device. Inadequate motor control can also result from the unnatural digit posturing required to interface with hand-held devices. Namely, because the surface area of a typical responsive portion of a hand-held device is a fraction of the size of the surface area of a typical size digit, natural digit or thumb movements about the axes of rotation of the joints of the digit or thumb are likely to cause undesirable results while using hand-held devices. In particular, the larger surface area of the digit or thumb is likely to trigger multiple responsive portions of a hand-held device when the digit or thumb is moved in a natural posture into contact with a responsive portion of a hand-held device. In order to interface with a hand-held device with greater accuracy and less frustration, hand-held device users resort to constrained or unnatural posturing of their digits or thumbs in an effort to contact the responsive portion of the hand-held device with a portion of the Up of the digit or thumb tip that has the smallest surface area. This often requires an unnatural or awkward posturing of the hand and thumb or digit. Whereas a natural digit or thumb movement would result in the digit or thumb 5 being substantially parallel to the hand-held device surface upon contact with the hand-held device, an unnatural digit or thumb movement would result in the digit or thumb being substantially perpendicular to the hand-held device surface upon contact so that the tip of the digit portion having the smaller surface area contacts the hand-held device, thereby leading to improved accuracy.

Individuals having a physical limitation associated with the hand may also experience pain as they try to coordinate their muscles to precisely stroke the miniature responsive portions of hand-held devices. It has also been observed that repetitive contact between the digits or thumbs and the miniature responsive portions on hand-held devices can exacerbate discomfort or a symptom associated with a physical limitation associated with the hand, such as carpal tunnel syndrome, or other arthritic or neuromuscular disorders. It is believed that numbness and pain in the thumb and joints of the hand are symptoms caused by or exacerbated by the repetitive stress of, or unnatural movements required by, using a hand-held electronic device. Use of such devises can cause symptoms such as pain, numbness and weakness and other injuries such as tendonitis or arthritis, even in an otherwise fully healthy individual with no pre-existing neuromuscular or arthritic disorder or pre-existing physical limitation.

Thus, individuals having a physical limitation associated with the hand are believed to have decreased access to hand-held devices due at least in part to the inadequate motor control over their digits needed to precisely and repetitively stroke the miniature responsive portions of hand-held devices or due at least in part to superimposed painful conditions resulting from repetitive strain of using a hand-held device.

In an embodiment, an apparatus of the present disclosure is provided for improving the ergonomics of a hand-held device. In such embodiments, the apparatus of the present disclosure for improving ergonomics of a hand-held device can be used to improve a user's motor control of a hand-held device. In an embodiment, an apparatus of the present disclosure is provided for improving a user's motor control of a hand-held device. In an embodiment, an apparatus of the present disclosure for improving the motor control of a hand-held device can be used to improve the motor control of hand-held devices for users with a physical limitation associated with the hand or to potentially diminish the likelihood that the user will develop symptoms or an exacerbated diagnosis by using such a hand-held device. In an embodiment, an apparatus for improving the motor control of hand-held devices comprises a body configured to conform to a digit and a member connected to the body positioned adjacent to a distal portion of the digit, wherein the positioning of the member adjacent to the distal portion of the digit allows the digit to maintain a more natural and neutral position when the digit moves the member into contact with a responsive portion of a hand-held device. In an embodiment, the natural position comprises a position substantially parallel to a major surface of the hand-held device. In an embodiment, the natural position comprises a position substantially parallel to a longitudinal axis of a hand-held device. In an embodiment, an apparatus for improving motor control of a hand-held device comprises a body configured to conform to a digit, wherein when the body conforms to the digit the body allows each joint of the digit to move freely about its maximum range of natural motion, and a member connected to the body adjacent to a distal portion of the digit for transferring force from the digit to a responsive portion of a hand-held device, wherein the positioning of the member adjacent to the distal portion of the digit allows the digit to maintain a natural position when the member transfers the force from the digit to the responsive portion of the hand-held device.

In an embodiment, an apparatus 10 of the present disclosure can be used for reducing an effective surface area of a tip of the digit. It is believed that reducing the effective surface area of the tip of the digit allows a user to activate a first responsive portion of the hand-held device while minimizing the frequency of activating a second responsive portion of the hand-held device, thereby improving a user's accuracy while using the hand-held device by minimizing frequency of errors while using the hand-held device. It is believed that by reducing the effective surface area of a tip of the digit, the apparatus 10 of the present disclosure can improve user control over a hand-held device. In an embodiment, the apparatus 10 of the present disclosure for reducing the effective surface area of a tip of the digit can improve the accuracy of using a hand-held device. In an embodiment, the apparatus 10 of the present disclosure for reducing the effective surface area of a tip of the digit can improve the speed of using a hand-held device. In an embodiment, the apparatus 10 of the present disclosure for reducing the effective surface area of a tip of the digit can reduce error while using a hand-held device.

All patents, patent applications, and published references cited herein are hereby incorporated by reference in their entirety. It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for using a handheld device comprising: a body configured to conform to only one digit of a user; and a member connected and substantially perpendicular to the body adjacent to the digit, wherein said member is movable along a circumferential track to be oriented over a number of different angles with respect to the body by moving said member along a curved surface of said body; wherein bringing said member into contact with the handheld device transfers force from the digit to the handheld device.

2. The apparatus of claim 1, wherein the member can be used to perform on the handheld device a gesture, typing, tapping, pressing, writing, drawing, painting, switching, sliding, texting, selecting, inputting, holding, or combinations thereof.

3. The apparatus of claim 1, wherein said member is removable or replaceable.

4. The apparatus of claim 1, wherein said member is relocatable.

5. The apparatus of claim 1, wherein said member is rotatable or pivotable.

6. An apparatus for aiding in the use of a hand-held device where the hand-held device includes responsive activation areas comprising:
   a body, said body including a proximal end and a distal end, said proximal end including an aperture means for receiving only a portion of a digit of a user and where said body also includes an inner surface and an outer surface;
   at least one activation member, said activation member being disposed on said outer surface of said body and extending away therefrom, said at least one activation member shaped and adapted to transfer force to a responsive portion of a hand-held device including having a cross sectional size of =<0.5 mm;
   said body inner surface being adapted to conform to at least one digit of a users' hand, said body including a slot adapted to receive said at least one activation member such that said at least one activation member is movable from a first position to a second position:
   whereby
   said body is placed over at least one digit of a users' hand conforming to the at least one digit and said activation member is used to activate responsive activation areas on the hand-held device.

7. The apparatus according to claim 6 at least one digit is selected from the group of thumb, index finger; middle finger, ring finger and pinky finger.

8. The apparatus according to claim 6 where said body is composed of a flexible material.

\* \* \* \* \*